United States Patent
Ritamaki et al.

(10) Patent No.: US 9,076,092 B2
(45) Date of Patent: Jul. 7, 2015

(54) RFID TRANSPONDER AND A METHOD FOR FABRICATING THE SAME

(75) Inventors: Matti Ritamaki, Nokia (FI); Antti Ruhanen, Tampere (FI); Jarkko Miettinen, Ylojarvi (FI)

(73) Assignee: CONFIDEX LTD., Tampere (FI)

( * ) Notice: Subject to any disclaimer, the term of this patent is extended or adjusted under 35 U.S.C. 154(b) by 278 days.

(21) Appl. No.: 13/319,053

(22) PCT Filed: May 8, 2009

(86) PCT No.: PCT/CN2009/071713
§ 371 (c)(1),
(2), (4) Date: Nov. 4, 2011

(87) PCT Pub. No.: WO2010/127509
PCT Pub. Date: Nov. 11, 2010

(65) Prior Publication Data
US 2012/0056002 A1    Mar. 8, 2012

(30) Foreign Application Priority Data

May 8, 2009    (WO) ................ PCT/CN2009/071713
May 10, 2010   (WO) ................ PCT/CN2010/072581

(51) Int. Cl.
G06K 19/06 (2006.01)
G06K 19/07 (2006.01)
G06K 19/077 (2006.01)

(52) U.S. Cl.
CPC ...... *G06K 19/0723* (2013.01); *G06K 19/07786* (2013.01)

(58) Field of Classification Search
CPC ............... G06K 19/07749; G06K 19/0723; G06K 19/07786

USPC ......................................... 235/487, 492, 451
See application file for complete search history.

(56) References Cited

U.S. PATENT DOCUMENTS

| 7,106,173 | B2 * | 9/2006 | Scott et al. ................... 340/10.1 |
| 7,202,789 | B1 * | 4/2007 | Stilp ......................... 340/572.1 |
| 7,729,722 | B2 * | 6/2010 | Rofougaran et al. ....... 455/550.1 |
| 7,812,771 | B2 * | 10/2010 | Greene et al. ................ 343/702 |
| 2003/0231106 | A1 * | 12/2003 | Shafer ....................... 340/10.34 |
| 2006/0012464 | A1 * | 1/2006 | Nitzan et al. ................ 340/10.1 |
| 2007/0069895 | A1 * | 3/2007 | Koh ........................... 340/572.1 |
| 2007/0132592 | A1 * | 6/2007 | Stewart et al. ............. 340/572.8 |
| 2008/0179404 | A1 * | 7/2008 | Finn ............................. 235/492 |
| 2009/0095818 | A1 * | 4/2009 | Smith et al. .................. 235/492 |
| 2009/0250522 | A1 * | 10/2009 | Williams et al. ............. 235/492 |
| 2011/0031821 | A1 * | 2/2011 | Greene et al. ................ 307/154 |
| 2013/0257473 | A1 * | 10/2013 | Adams et al. .................... 326/8 |

FOREIGN PATENT DOCUMENTS

| CN | 101305387 A | 11/2008 |
| WO | 2007125164 A1 | 11/2007 |

* cited by examiner

Primary Examiner — Thien M Le
Assistant Examiner — April Taylor
(74) Attorney, Agent, or Firm — Haverstock & Owens LLP

(57) ABSTRACT

The present application provides a radio frequency identification (RFID) transponder and a method for fabricating the same. The RFID transponder, comprising: a microchip which is arranged to communicating with a reader; a battery which is arranged to provide an electrical power for operating the transponder, and is attached to the microchip by means of a conductive path; an antenna which is arranged to receive and backscatter radio frequency interrogation radiation; and a substrate, on which the microchip, the battery and the antenna are arranged.

49 Claims, 14 Drawing Sheets 134 
133 
132 
131

RFID TRANSPONDER AND A METHOD FOR FABRICATING THE SAME

CROSS REFERENCE TO RELATED APPLICATION

This application claims the priority of the PCT Application No. PCT/CN2009/071713 filed on May 8, 2009 which is incorporated herein by reference in its entirety.

FIELD OF INVENTION

The present invention relates to a RFID transponder and, more specifically, to a RFID (Radio Frequency Identification) transponder for vehicle identification and a method for fabricating the same.

BACKGROUND OF INVENTION

Electronic vehicle identification is known as an automatic method of monitoring a vehicle which typically is done with a wireless interface between the vehicle and the monitoring devices (i.e. a reader). An electronic vehicle identification system is based on a RFID transponder (i.e. RFID tag) that is attached to the vehicle and a reader with an antenna for interrogating with the vehicle.

A RFID transponder is used for providing remotely controllable identity information of the vehicle. With the user configurable memory in the RFID transponder, the information can be written and read remotely. A RFID transponder is commonly classified, in terms of the use they make of an internal power source, as: a passive RFID transponder which has no internal power source and uses the energy of the RF radiation transmitted by the reader; an active RFID transponder which comprises an internal power source that is used for both powering the transponder and for generating the RF energy required for transmitting a response radiation; and a battery-assisted RFID transponder (also referred to as a semi-active or a semi-passive transponder) which comprises an internal power source, where the energy of the response radiation is derived from the interrogation radiation provided by the reader and the transponder circuitry is powered by the internal power source.

In the passive RFID transponder, the limitation is a reading distance while the RFID transponder needs to receive its operating power from a reader. In the active RFID transponder, the RFID transponder has a transmitter which requires more complex electronics for the functionality thus resulting high cost and consumption of power compared to the battery-assisted RFID transponder and the passive RFID transponder. The energy required for battery-assisted RFID transponder and the passive RFID transponder to function is considerably less than for the active RFID transponder.

However, in the existing RFID transponder, the antenna and the battery are usually separate components. Thus it is inconvenient for the transponders to be used in vehicle identification. Meanwhile, the security, reading distance and the convenience of the existing RFID transponder need to be improved.

SUMMARY OF INVENTION

The present invention provides a RFID transponder for vehicle identification and a method for fabricating the same.

According to an aspect of the present invention, there is provided a RFID transponder comprising: a microchip, which is arranged to communicating with a reader; a battery, which is arranged to provide electrical power for operating the transponder, and is attached to the microchip by means of a conductive path; an antenna, which is arranged to receive and backscatter radio frequency interrogation radiation; and a substrate, on which the microchip, the battery and the antenna are arranged, wherein the battery and the antenna integrated in the same level of the substrate.

In an embodiment of the RFID transponder according to the present application, the battery may be integrated as a part of the antenna.

In an embodiment of the RFID transponder according to the present application, the battery may act as a ground plane for the antenna.

In an embodiment of the RFID transponder according to the present application, the battery may act as a pole of the antenna when the antenna is a dipole antenna.

In an embodiment of the RFID transponder according to the present application, the antenna may be an inverted F antenna or a dipole antenna.

In an embodiment of the RFID transponder according to the present application, the conductive path may be a conductive wire, conductive glue or mechanical bond.

The RFID transponder according to one embodiment of the present application may further comprise an encryption component, which is arranged to encode vehicle specific data with an encryption algorithm for preventing unauthorized use, cloning or counterfeiting of the RFID transponder.

The RFID transponder according to one embodiment of the present application may further comprise a perforation area, which is arranged to weaken the tensile strength of the substrate, so that when an adhesive label is attempted to be removed the substrate will tear along the perforation.

In an embodiment of the RFID transponder according to the present application, the microchip may comprise both the analog part to modify the impedance matching of the antenna and the digital part which holds the logical functions and memory to enable the RFID functionalities according to the used air-interface standards.

In an embodiment of the RFID transponder according to the present application, the substrate may further comprise IC bonding area and contact area for battery.

In an embodiment of the RFID transponder according to the present application, battery connection to the antenna or microchip is done with mechanically crimping the layers to each other, by using conductive paste or film (ACP, ACF), soldering or with ultra sonic welding.

In an embodiment of the RFID transponder according to the present application, the transponder is primarily checked by utilizing the tag identification (TID) number which is unique for all microchips.

In another embodiment of the present invention, the RFID transponder further comprises an encryption component, which is adapted for encoding vehicle specific data with an encryption algorithm for preventing unauthorized use, cloning or counterfeiting of the RFID transponder or its information.

In another embodiment of the present invention, the RFID transponder further comprises an external power usage component, which is adapted for utilizing an external power source to improve the reading distance in the various situations where vehicle is required to be identified.

In another embodiment of the present invention, the RFID transponder uses globally accepted communication air-interface standard.

In an embodiment of the RFID transponder according to the present application, the battery is attached to the antenna and the microchip by welding process.

In an embodiment of the RFID transponder according to the present application, said welding process is an ultra-sonic welding process.

In an embodiment of the RFID transponder according to the present application, said welding process is a heat welding process.

In an embodiment of the RFID transponder according to the present application, said welding process uses non-conductive adhesive.

In an embodiment of the RFID transponder according to the present application, said welding process uses pressure sensitive adhesive.

In an embodiment of the RFID transponder according to the present application, said welding process uses hot melt adhesive.

In an embodiment of the RFID transponder according to the present application, said battery is sealed by welding process.

In an embodiment of the RFID transponder according to the present application, said transponder is sealed by welding process.

In an embodiment of the RFID transponder according to the present application, RFID straps are attached to said antenna by welding process.

In an embodiment of the RFID transponder according to the present application, galvanic connection is formed between the battery and RFID tag circuitry in continuous reel-to-reel process by pressing the battery and RFID tag circuitry together and creating a defined pattern.

In an embodiment of the RFID transponder according to the present application, galvanic connection is formed between the battery and RFID tag circuitry in stop-and-go, reel-to-reel process by pressing the battery and RFID tag circuitry together and creating a defined pattern.

In an embodiment of the RFID transponder according to the present application, the battery is a thin film battery.

In an embodiment of the RFID transponder according to the present application, the battery is a thin photo voltaic cell.

In an embodiment of the RFID transponder according to the present application, said transponder comprises a power reservoir.

In an embodiment of the RFID transponder according to the present application, said power reservoir is attached to an antenna and microchip by using welding process.

In an embodiment of the RFID transponder according to the present application, said welding process uses conductive adhesive.

In an embodiment of the RFID transponder according to the present application, said welding process uses non-conductive adhesive.

In an embodiment of the RFID transponder according to the present application, said power reservoir is attached to an antenna and microchip by using conductive adhesive materials.

In an embodiment of the RFID transponder according to the present application, said power reservoir is in parallel with said photo voltaic cell.

In an embodiment of the RFID transponder according to the present application, said power reservoir is in connected with said microchip directly.

In an embodiment of the RFID transponder according to the present application, said power reservoir is a capacitor.

In an embodiment of the RFID transponder according to the present application, said power reservoir is a battery.

In an embodiment of the RFID transponder according to the present application, the battery is a beta decay source power cell.

In an embodiment of the RFID transponder according to the present application, the beta decay source power cell is a tritium power cell.

The present invention also provides a method for fabricating a radio frequency identification (RFID) transponder, comprising: preparing a substrate; arranging a microchip, a battery and an antenna on the substrate, wherein the microchip is arranged to communicating with a reader, the battery is arranged to provide electrical power for operating the transponder, and is attached to the microchip by means of a conductive path, and the antenna is arranged to receive and backscatter radio frequency interrogation radiation; integrating the battery and said antenna in the same level of said substrate.

The present invention incorporates the battery and the antenna of the RFID transponder to each other. Specifically, the present invention combines the resonant parts (antenna) and the battery (supply voltage), which simplifies the production as the antenna and the battery do not necessarily need to be separate components.

DETAILED DESCRIPTION OF EMBODIMENTS

Detailed descriptions will be given below to embodiments of the present invention.

The RFID transponder according to one embodiment of the present invention can comprise:
a) an antenna arranged to receive/backscatter radio frequency interrogation radiation from/to a RFID reader;
b) a microchip which has both an analogue part for modifying the impedance matching of an antenna circuitry, and a digital part for holding the logical functions and memory which enable RFID functionalities according to the air-interface standards that are used in the RFID transponder;
c) a battery attached to the microchip by means of conductive path, such as a conductive wire between the battery and the microchip, conductive glue or mechanical bond between the microchip and the battery, and the battery is in most cases a thin-film battery with thickness less to 1 millimeter;
d) a substrate, which for example is rigid or flexible, and on which the antenna, the microchip and the battery are constructed. The substrate can be for example a printable circuit board or a PET plastic film with a adhered conductive metal layer which is etched to form a resonant antenna;
e) a housing which can be either laminated in a form of a paper of plastic films adhered on both sides of the RFID transponder, or the housing can be constructed of rigid, non-flexible parts that create an enclosure around the RFID transponder. This encapsulation is typically done from plastics or fibreglass materials, but can be also any material suitable for encapsulating resonant components at ultra-high frequencies.

Figure 1:
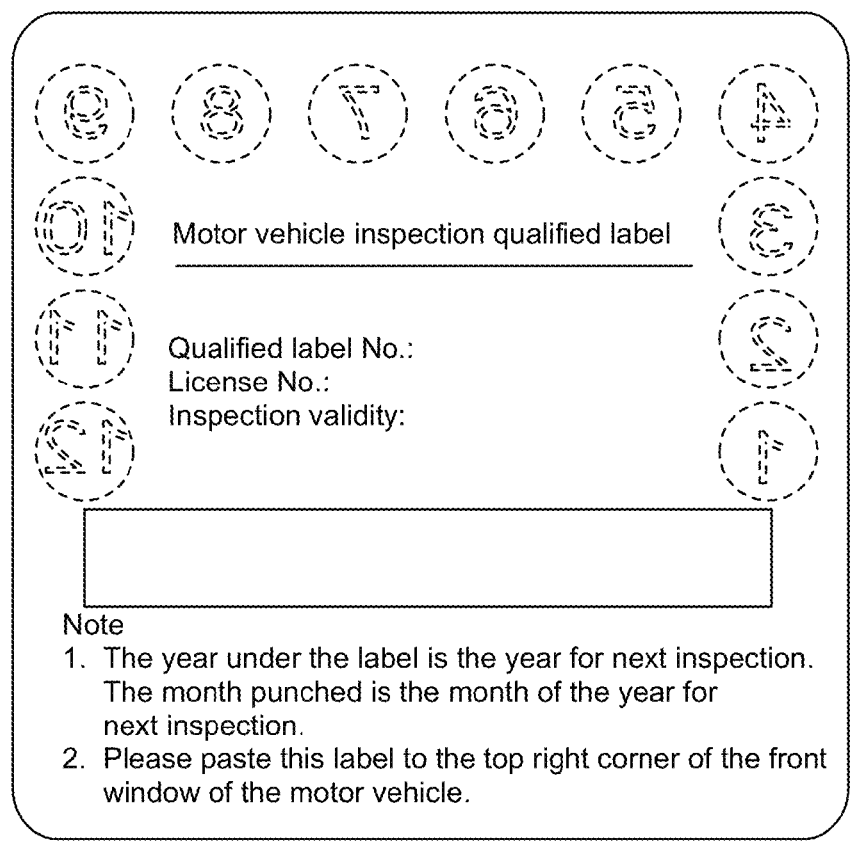
FIG. 1 is an example of the RFID transponder according to an embodiment of the present invention.

FIG. 1 is a front face of the RFID transponder according to one embodiment of the present invention. The RFID transponder shown in FIG. 1 is the outline of a data label designed for vehicle identification. It has a printed face material with adhesive that can be used to affix the transponder to the inside of windshield. Data label material can be paper or synthetic material such as plastic.

Figure 2:
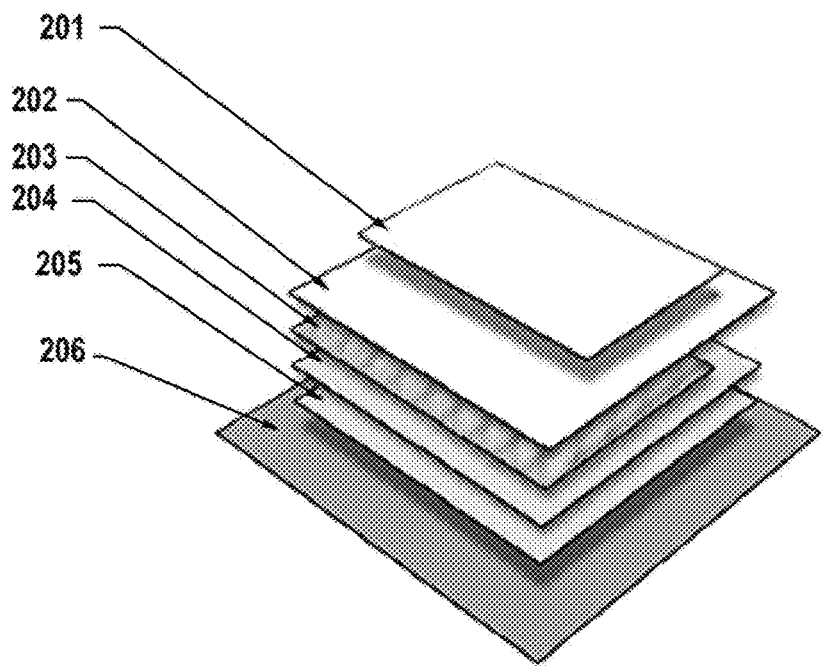
FIG. 2 shows the hierarchy of the RFID transponder according to an embodiment of the present invention.

FIG. 2 shows the hierarchy of the RFID transponder according to one embodiment of the present invention. The RFID transponder shown in FIG. 2 can comprise a data label 201, a front face 202, a battery 203, a RFID inlay 204 including a substrate with an antenna and a microchip connected to the antenna, a backside adhesive layer 205, and silicone liner 206.

The data label 201 is used to show printed information which can be stored in the transponder microchip's memory. An example of the data label is shown in FIG. 1.

The front face 202 is used to create a levelling layer for protecting the battery 203 and the RFID inlay 204. This front face 202 can be paper or synthetic material such as plastic.

The thin film battery 203 is used to provide power for the microchip on the substrate when the RFID transponder is communicating with the RFID reader.

The RFID inlay 204 comprises a substrate with an antenna and a microchip connected to the antenna, and is used to enable the RFID functionality.

The backside adhesive layer 205 is used to attach the RFID transponder to vehicle windshield glass, or other tracked object.

The silicone liner 206 is used to carry the RFID transponder until it is adhered to a tracked object. Silicone layer allows the transponder to be removed.

Figure 3:
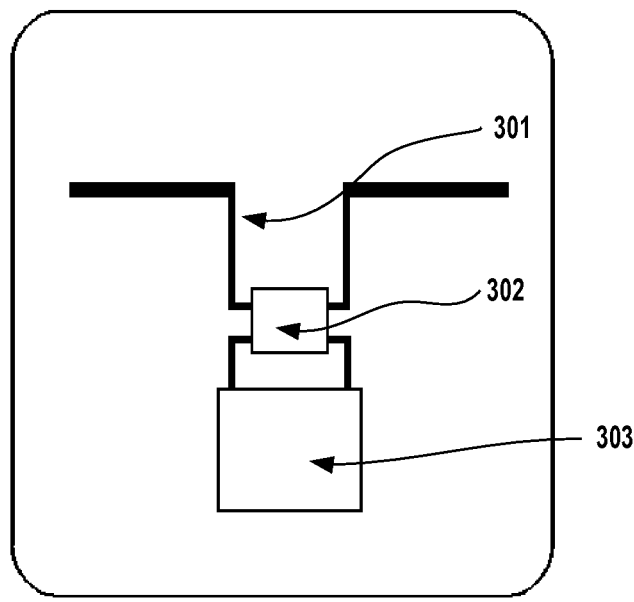
FIG. 3 is a circuit diagram of the RFID transponder according to an embodiment of the present invention.

FIG. 3 is a simplified circuit diagram of the RFID transponder according to one embodiment of the present invention.

FIG. 3 shows the interconnection of the battery to the microchip, and the interconnection of the antenna to the microchip. FIG. 3 only illustrates an example to explain the connection of the antenna, the battery and the microchip. There is no limitation on the size or design of the antenna and the battery in the RFID transponder. The elements in the FIG. 3 are figurative and do not represent the actual size or form of the components. Those skilled in the art will appreciate that this will apply whatever is the size or design of the antenna or battery in the RFID transponder.

The RFID transponder shown in FIG. 3 comprises: an antenna 301, a RFID microchip 302, and a battery 303.

The antenna 301 is connected to the RFID microchip 302 and the RFID microchip 302 is connected to the battery 303. The RFID microchip 302 has input connectors for the antenna 301 to receive power and signals from a transmitting reader, and input connectors for the battery 303, such as a thin-film or button battery. The connection between the antenna 301, the RFID microchip 302 and the battery 303 can be done by welding, soldering or by gluing with conductive glue. Microchip 302 can operate at passive, semi-passive or active mode. In the passive mode, the RFID transponder does not have own power source. All required energy is harvested from the reader field. In the semi-passive mode, the RFID transponder has own voltage supply and logic that can operate without reader field. Read range is typically much higher than in the passive mode. The RFID transponder will communicate with back-scatter method in both passive and semi-passive mode. Active RFID microchip would have own transmitter and receiver. In the active mode, the read range can be significantly higher than in the passive and semi-passive modes. A plurality of RFID transponders can also form sensor network and communicate with each other. Microchip can also have additional connectors for sensor, which will monitor temperature or tampering of the tag or some other physical phenomenon.

Figure 4:
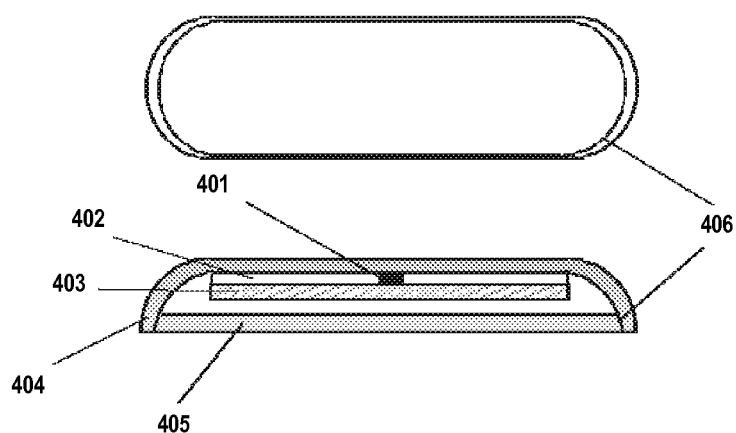
FIG. 4 is an encapsulation diagram of the RFID transponder according to an embodiment of the present invention.

FIG. 4 is an encapsulation diagram of the RFID transponder according to an embodiment of the present invention.

The encapsulation can be constructed of plastic housing parts 404 and 405 which are glued, ultrasonically welded or affixed mechanically with plastic or metallic parts like screws, pop-rivets or studs.

In this embodiment, the integration level of the RFID transponder is enhanced by combining the antenna and battery with conductive paths. These conductive paths can be generated by soldering, welding, mechanically crimping or adhering with conductive paste. Typically the antenna is etched or printed on a substrate which is made of plastics, papers or fibreglass materials. The battery will act as a ground plane for the antenna or it can be a pole of dipole antenna. This invention will significantly reduce required size and cost of this type of RFID transponder, functioning at ultra high frequencies.

In FIG. 4, the microchip 401 is connected to an antenna on the RFID inlay 403. The adhesive 402 is used for attaching the RFID inlay to the cover of the RFID transponder. The RFID inlay 403 comprises a carrier substrate with antenna and the microchip 401 attached to the RFID inlay 403. The RFID inlay 403 also can have a battery (thin-film or other type) attached to the microchip 401, for example, attached to the power input pins in the microchip.

The encapsulation for the RFID transponder comprises two parts 404 and 405. The encapsulation can be made of synthetic materials such as plastics or natural materials such as cardboard or plywood. The parts 404 and 405 are connected from the seam 406, with glue, soldering, ultra-sonic welding or by having mechanical locking parts such as screws, staples or other similar attachment components. The seam 406 is between the two encapsulation parts 404 and 405.

Figure 5:
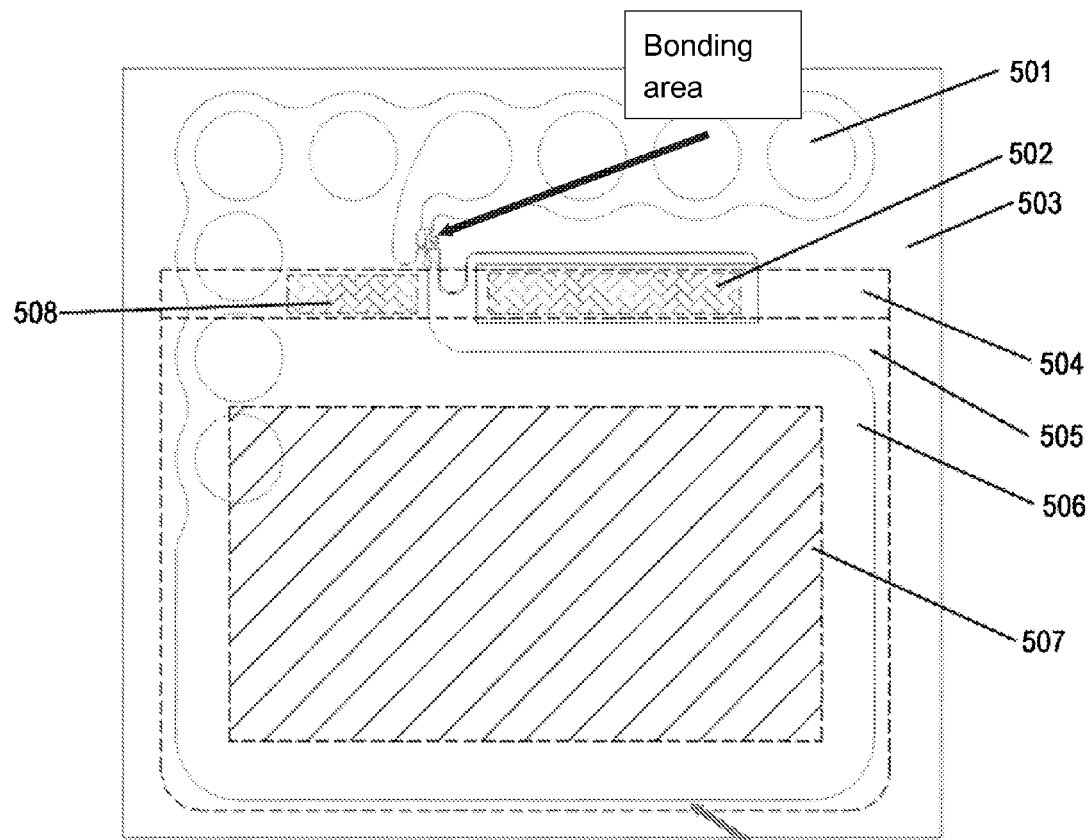
FIG. 5 is a battery assisted RFID transponder according to an embodiment of the present invention.

FIG. 5 is a battery assisted RFID transponder according to an embodiment of the present invention. In contrast with FIG. 3 shown only as schematic interconnection between components such as the microchip, the antenna and the battery, FIG. 5, as described in details in the following paragraph, shows an embodiment of a tag design.

The RFID transponder shown in FIG. 5 comprises: a substrate 503 which may be made of plastic or paper, an antenna 501 and 506, and areas for planned contact pads 502, 508 for a thin-film battery 504 and 505. The printing area 507 is reserved for customer specific human-readable information and it has to be with even thickness to enable various printing methods. The antenna geometry in the FIG. 5 design is called inverted F antenna. Both antenna geometries are designed to function in ultra-high frequency band.

Thin film battery 504 and 505 will be placed above the ground plane. Basically, the ground plane is a large area of metal. Large ground plane will improve the performance of the antenna. Battery leads have galvanic connection to the antenna. Connection can be done with crimping, anisotropic conductive adhesive or soldering.

Another way to manufacture the RFID transponder is to design battery such a way that antenna and IC bonding area (see FIG. 5) is on the same substrate with the battery. Since a battery is a metallic component, so it may conduct electrons like antenna. Thus, the battery may be part of the antenna and requires RF block to prevent RF signal to penetrate to the battery. Meander line or long wire in positive (it can be also negative, if the microchip has positive earth) battery terminal will introduce high enough impedance at UHF frequency. Typically, a microchip has three pads: ground, antenna, supply voltage. The supply voltage is provided by the battery, and the supply voltage provides a "threshold voltage" to keep the RFID transponder in operation during the communication with the reader. There is antenna input connections ("pads"), and separate pads from battery (+) and (−) in the Bonding area. The microchip is then placed on to the pads.

Common ground will be used for the battery and the antenna. An antenna pad will be connected to the antenna. The impedance of the antenna needs to be matched to the chip impedance by using traditional impedance matching methods.

In this example the impedance is matched with inductive loop which will match to the capacitance of the chip. Impedance of the chip is typically capacitive. Optimal power transfer from the antenna to the chip will occur when the capacitance of IC and inductance of the antenna will form a resonance circuit. Inductance of the antenna can be adjusted by adjusting the size of the loop. Voltage supply pad is connected to the battery through the RF block wire.

Alternative solution for the antenna is the dipole antenna. The dipole antenna structure is illustrated in FIG. 3/301 and in FIG. 6/604. If the antenna is a dipole antenna, the RFID transponder can be manufactured and used same way as IFA, but it does not have a ground plane. In this structure the battery is placed above another pole of the dipole antenna. RF blocking is done with a meander line.

Thus, if the antenna is IFA, the battery and the antenna have the same ground plane; and if the antenna is a dipole antenna, a battery is placed above a pole of the dipole antenna and acts as a pole.

A battery can be integrated with the antenna. This innovation will reduce cost and thickness of the RFID transponder.

Typical battery chemistry is for alkaline cells as follows. The anode is made from zinc. The cathode can be Manganese dioxide. The electrolyte is for example potassium hydroxide. Another typical battery is called a dry cell or a zinc carbon cell. The cathode is made from manganese dioxide, the anode from zinc and the electrolyte can be ammonium chloride or zinc chloride dissolved in water. A zinc anode can be directly laminated on the antenna pattern. The cathode can be also printed on the antenna. The electrolyte can be dissolve to fabric or paper on top of the anode and cathode. Whole structure will be sealed by laminating the face film. This film can be for example PP or PET. This innovation will make the battery structure very well sealed, since there are no external contacts. Contact areas might leak moisture out. If the moisture is evaporated out, then the battery does not give any current. Better sealing will increase the life time of the battery significantly.

The present invention also provides a method for producing a RFID transponder, which comprises the following steps: combining a microchip to an antenna with materials, such as conductive or non-conductive glue, to form a RFID inlay; after the microchip is combined with the antenna, attaching the battery by conductive glue; welding or mechanically fastening the RFID inlay and the battery before possible lamination of face or backside layers of paper, plastic or other materials. Common methods for adding these layers are lamination where layers are attached together by glue, or by molding where plastic material is added to the RFID inlay in a mould which create a specific form of the encapsulation.

The present invention also provides another method for producing a RFID transponder, comprising: preparing a battery with a suitable antenna structure incorporated with the battery so that only the RFID microchip attachment is required to enable the RFID inlay to function; then constructing additional layers in a similar way as in the first method.

Figure 6:
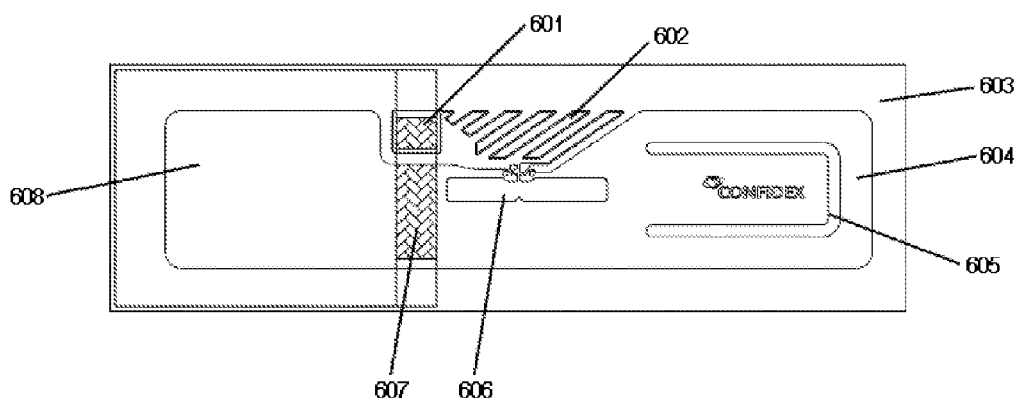
FIG. 6 is a representation of the battery assisted RFID transponder according to an embodiment of the present invention.

FIG. 6 is a representation of the RFID transponder according to an embodiment of the present invention. The antenna geometry in FIG. 6 is a dipole antenna which is different from that shown in FIG. 5 which is called inverted F antenna. Both antenna geometries are designed to function in ultra-high frequency band.

The battery-assisted RFID transponder comprise: a positive battery terminal 601, a RF block 602, a substrate 603, an antenna pattern 604, an antenna poles 605, 608, an inductive loop 606, a negative battery terminal 607.

The positive battery terminal 601 is required to work together with the negative battery terminal 607 to supply power to the microchip.

The RF block 602 may be a high impedance element which prevents RF signals at UHF frequency to penetrate to the battery. The RF block can be formed with a meander line or a spiral coil. Also a long wire might produce sufficient inductance. Without a RF block inductor, the battery will be part of the antenna circuit and might lead to bad antenna efficiency.

The substrate 603 may be a carrier film on which other components are layered.

The antenna pattern 604 represents the example antenna pattern in the RFID transponder.

The antenna poles 605, 608 are the antenna poles required in a dipole antenna to operate as intended in RF communication according to commonly known antenna theories.

The inductive loop 606 is required to create an appropriate inductance for the resonance circuit i.e. antenna comprising both capacitive and inductive elements.

Figure 7:
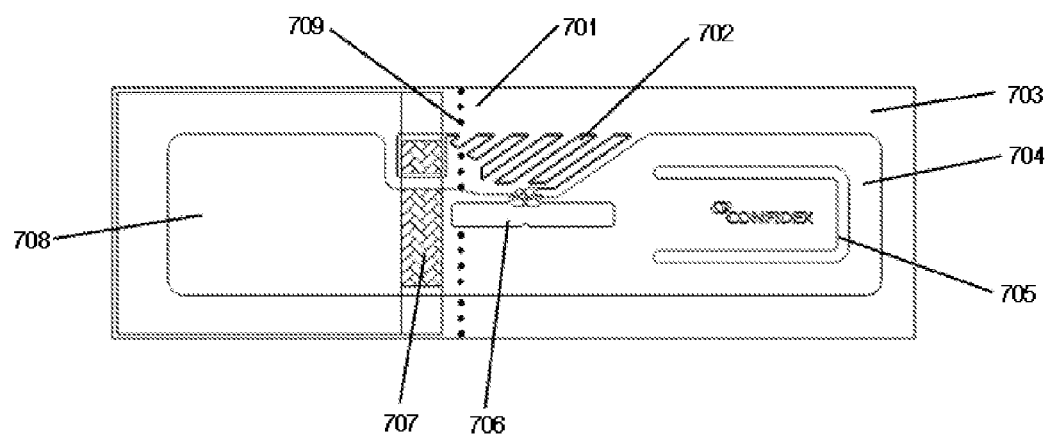
FIG. 7 is another representation of the battery assisted RFID transponder according to an embodiment of the present invention.

FIG. 7 is another representation of the battery assisted RFID transponder according to an embodiment of the present invention.

If the transponder is used for vehicle identification, it's not desired to be removed and placed on another vehicle—same as License plate of vehicle. Thus, when the adhesive label is attempted to be removed, the transponder is liable to be physically damaged in the prior art. In the present invention solves this problem, as is shown in FIG. 7.

The positive battery terminal 701 is required to work together with the negative battery terminal 707 to supply power to the microchip.

The RF block 702 may be a high impedance element which prevents RF signals at UHF frequency to penetrate to the battery.

The substrate 703 may be a carrier film on which other components are layered.

The antenna pattern 704 represents the example antenna pattern in the RFID transponder.

The antenna poles 705, 708 are the antenna poles required in a dipole antenna to operate as intended in RF communication according to commonly known antenna theories.

The inductive loop 706 is required to create an appropriate inductance for the resonance circuit i.e. antenna comprising both capacitive and inductive elements.

Comparing with FIG. 6, the RFID transponder in FIG. 7 is added with a mechanically perforated or die-cut punctures. The black dot line 709 shown in FIG. 7 represents these punctured holes which reduce the material strength against removal after the RFID transponder has been adhered to a surface in any application. The purpose of this function is to provide an additional tamper-evidence in the case where the tag is not supposed to be removed and if such occurs, the RFID transponder will be torn, providing visual and electronic means to verify the attempted removal. The perforation is designed to go close of the meander line which has a thin conductor line. When this part is torn, the battery will get disconnect, thus dramatically reducing the performance. The torn paper or plastic face material is also damaged, providing a proof of attempted removal of the RFID transponder. In case of periodical renewal of the RFID transponder, the outdated product can be deactivated by tearing the tag easily due to the perforation line 709.

Displacing the transponder to other vehicle can be made difficult by using tamper evident tag production techniques. When such design is used, detaching the transponder will physically damage it, making the detachment visible. The embodiment shown in FIG. 7 illustrates a method for creating tamper-evidence features to the RFID transponder. In FIG. 7, the layers of the RFID transponder have been pierced through i.e. perforated, to weaken the tensile strength of the substrate. In such cases when the adhesive label is attempted to be removed, the substrate will tear along the perforation line.

The present invention also solves the problem of security issue in a vehicle identification system.

Identification speed is very critical issue in vehicle identification system. Vehicles are fast moving objects and thus they may spend very short period in the area where transponder can be read. Additionally fast flowing traffic creates challenge for vehicle management as tens of transponder are appearing and disappearing each second.

The capability to separate each RFID transponder with specific algorithm is given by the used air interface standard. Only transponder identification number is transferred during the management of multiple tags. Transferring any other data requires additional commands and thus takes more time. If transponder identification number does not contain any meaningful data, the license plate (and other data) must be associated with the transponder identification number in the backend system i.e. database that contains the additional information. This approach works well but would need a real time network connection to a database.

Therefore the most essential data is encoded as a part of transponder identification number. This data can include for example vehicle register plate and owner information. The data can be encoded to transponder identification number as plain text or as encrypted text. If the data is encrypted, unauthorized parties could not decrypt the content and the data would remain meaningless.

Cloning, counterfeiting and misuse of vehicle identification transponder are presumable threats.

Tampering the data content of the transponder can be hindered by locking the transponder memory. Counterfeit transponders can be disclosed with authentication. Transponder authenticity can be checked by using centralized database of TID-numbers of authentic transponders. TID-number is unchangeable serial number of a transponder.

A RFID transponder may be authorized by use of a digital signature of the RFID transponder, a password, or customized reader commands.

(1) Transponder can contain a digital signature which is composed of actual data and/or TED-number and is calculated with desired cryptographic functions. Message digest is first calculated with hashing functions. These functions include for example MD5 and SHA hash functions. Calculated message digest is further ciphered with cryptographic ciphering function such as AES or DES. Digital signature is stored in a transponder memory.

(2) Another way to authenticate the tag is to use a password. The password can be set during tag production. The password can be encrypted from the transponder identification number with a secret key. The tag does not go to the secured state if the password is not correct.

(3) It is also possible to use customized reader commands to authenticate the tag. All communication can be encrypted with the stream ciphers. Stream ciphers are suitable for the serialized communication like ISO18000-6C. A stream cipher is a symmetric key cipher where plaintext bits are combined with a pseudorandom cipher bit stream (keystream), typically by an exclusive-or (xor) operation. In a stream cipher the plaintext digits are encrypted one at a time, and the transformation of successive digits varies during the encryption. Stream ciphers typically execute at a higher speed than block ciphers and have lower hardware complexity. The ciphers can be used for all communication, but also only for the data.

Figure 15:
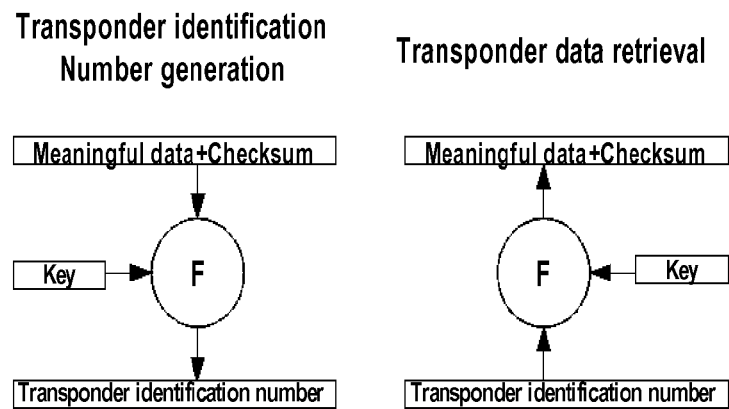
FIG. 15 shows an example of the method of encrypting the identification key data of the RFID transponder.

(4) Time to transact with a tag may be very limited for example in some vehicle identification applications. In those situations, tags can't be authenticated as mentioned above; only tag identification number can be detected. This is due the fact that, standardized air interface protocols are designed to do identification extremely fast. Further communication with a tag takes more time. To overcome this issue, tag identification number can include the most critical meaningful data and thus, that data is always captured. To prevent counterfeit tag manufacturing, the data can be encrypted and results can be used as identification number. Only cryptographic key holders can create valid identification numbers and thus the tag can be authenticated by decrypting the data and checking data unity with a checksum. This protects also privacy as transponder identification number remains meaningless except for key holders. The concept is illustrated in FIG. 15.

These features enable transponder data validity checks and transponder authentication even without connection to a centralized database.

A battery-assisted RFID microchip is capable of communicating with a reader, even if the battery (power source) is deactive. This is because the microchip is not using the battery for operating, but to reduce the required power for operating.

So, if a battery is deactive, the performance of the RFID transponder is reduced from the battery assisted state.

The antenna is harvesting energy at designated frequency range from the reader devices' propagating waves to the microchip. The antenna also backscatters the signals back to the reader.

In the invention the microchip can be operated in A) passive and B) battery-assisted modes.

In the passive mode the microchip is operational when a sufficient induced voltage level is generated from the connected antenna element. The antenna element generates the voltage from the propagating waves that are generated with a reader device. So, the reader device is providing both the operating voltage and the commands for retrieving information from the tag.

In the battery-assisted mode, the reader is mainly providing the commands for the RFID transponder, and the microchip is connected to an external power source which provides a threshold voltage for the microchip in order to function will lower level of received power from the reader device.

Functionality of the tag is the same in both modes. Only difference is in the performance of the tag. Battery assisted tag will go to the passive mode if the battery is empty.

The communication between the reader and the RFID transponder is based on the globally accepted air-interface protocol(s).

The data structure of the tag memory has at least a one-time programmable ID ("TID") which is installed during microchip production and is based on the ISO15963 standard. The microchip would also have to have at least 96-bit of user programmable memory which can be used to store the most important mandatory vehicle data i.e. license plate.

It is noted that batteries, and especially Thin Film batteries (later as "TF" batteries to distinguish from other battery types in this document) are used for thin and flexible electronics in radio frequency identification (RFID) applications, consumer cosmetics packaging etc. The TF battery has typically two contacts which need to be connected to the electronics in a device which requires the voltage source.

The nominal voltage of the TF battery depends on the chemistry inside the battery, but typically it is around 1.5V for zinc-manganese batteries and 3V for lithium batteries. Other electrochemical constructions based on tritium or lithium-ion can also be used which can provide sufficient power reservoir for a battery assisted RFID microchip.

The TF batteries can be constructed by laminating different layers of materials or by printing with silk screen or some other printing method to a carrier substrate material.

The TF batteries can be used in active RFID tag and a battery assisted passive (BAP) RFID transponder (tag) which is also called as semi-passive RFID tag.

As stated above, a passive RFID tag typically has an antenna connected to a RFID microchip creating a resonance circuitry and the operating voltage is induced by this resonance circuitry from electromagnetic waves. The idea in BAP RFID tag is that the RFID microchip would get required threshold voltage instead of the reader field, from the thin film battery. This energy from the battery will increase the reading distance substantially compared to a passive RFID tag which receives its operating power only from the reader device by electromagnetic waves. The battery will also bring new possibilities for the applications, since the RFID microchip can operate outside the reader field. Therefore the BAP RFID tag could be used for sensor functions or alarm functions for security applications where the microchip has additional functions in addition to exchanging data with the RFID reader device.

The active RFID tag and the battery assisted passive (BAP) RFID tag can be manufactured efficiently in the reel to reel format, since the tag can be less than 1 mm thick and flexible production in reel-to-reel format enables unique personalization for each BAP tag, such as visual printing and programming of the microchip's memory.

The reel-to-reel manufacturing is commonly used in passive RFID industry and manufacturing equipments are commercially available. The active tag and the BAP tag manufacturing is different from the passive RFID manufacturing in the battery assembly. Automatic applicator can be utilized to insert battery on the flexible antenna substrate.

The thin film battery is traditionally connected with conductive adhesives. Conductive adhesives can be conductive to all directions or only z-direction (anisotropic). Most conductive adhesives consist adhesives and metal particles. The adhesive brings mechanical strength to the connection and metal particles form galvanic connection between the contacts. The conductive adhesive can be in paste or coated film format. Usually some kind of bonding is required. Bonding may require pressure, heat and/or ultraviolet light. Curing time is usually reducing the capacity of manufacturing and the curing process time is relational to the pressure and heat used in the bonding process. Adhesives in liquid or paste form at are usually applied with dispenser or stencils.

The present invention provides an efficient method to create bonding for a thin film battery to a RFID tag. Instead of using conductive adhesives, an ultra-sonic or heat welding process can be used to form a galvanic connection between the TF battery and RFID tag circuitry. Welding is a fast process and it can be implemented in an inline, continuous manufacturing process. Ultra-sonic or heat welding will substantially reduce the material and manufacturing costs of a BAP tag compared to use of conductive adhesives.

Figure 8:
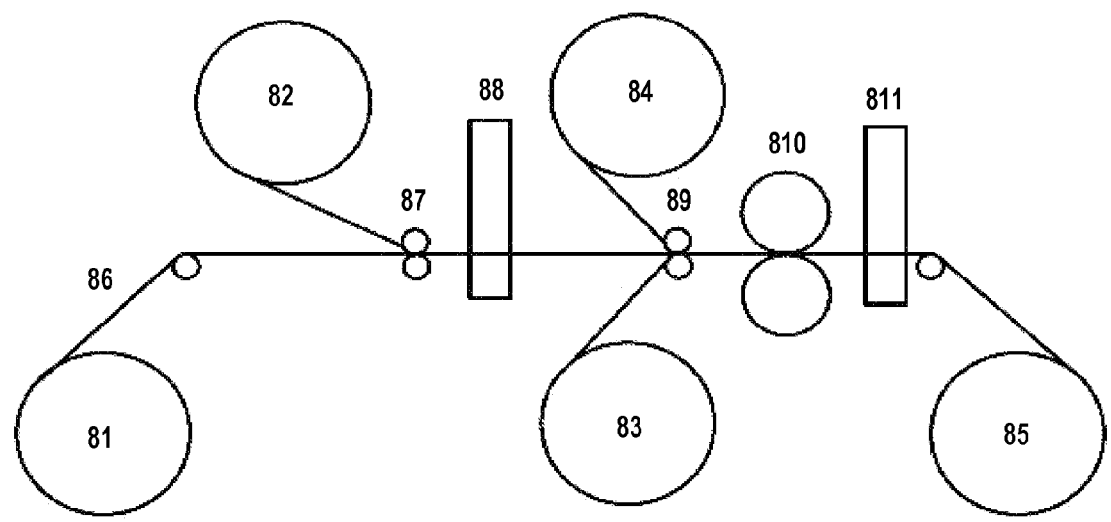
FIG. 8 is an example of a typical production line for BAP tags according to an embodiment of the present invention.

FIG. 8 is an example of a typical production line for BAP tags according to an embodiment of the present invention. Antennas including RFID microchip are in the reel 81. An antenna substrate is typically plastic such as PET. Antenna web is winded open from the reel 81. TF batteries 82 are inserted to the antenna. A Non-conductive PSA adhesive or a hot-melt adhesive can be used. Pressure rolls 87 bond the TF battery firmly on the RFID antenna. An electrical connection is formed with ultra-sonic or heat tool 88. Face 84 and back 83 material is laminated both sides of the tag. Press rolls 89 are utilized again. Tags are die-cut 810 to final size. RFID reader 811 will test electrical performance of the tag. Non functional tags are removed or marked as bad. Final products are re-winded to reel 85.

In FIG. 8, numeral 81 is the reel of RFID inlays with microchips. Numeral 82 is the reel of TF batteries with PSA adhesive or hotmelt. Numeral 83 is the reel of back laminate. It can be paper or plastic film. The film has adhesive on both sides. Numeral 84 is the reel of face film. It can be pre-printed. The film has adhesive on other side or adhesive can be laminated during production. Numeral 85 is the reel of finished products. Singulated format can be also used. Numberal 86 is the antenna web. Numeral 87 is the pressure rolls, which press the battery on top of the antenna web. Numeral 88 is a ultrasonic or heat welding tool, which forms electrical connection between the antenna and the battery. Numeral 89 is pressure rolls, which press the face and the back side films to the antenna web. Numberal 810 is die cut tool, which cuts labels from the antenna web. Numberal 811 is a RFID reader, which will perform final inspection and marking of bad labels.

Battery bonding begins with placing the TF battery on the antenna substrate i.e. carrier film. A battery can have a pressure sensitive adhesive (PSA) or adhesive can be on an antenna to adhere the battery to the correct position. A hot melt adhesive can be also used. A battery contact may be covered with a adhesive. This adhesion does not provide galvanic connection yet between the TF battery and RFID tag.

Next step is welding with ultra-sonic or heat. Welding tool has a raster or some other pattern, which will penetrate through non-conductive adhesive and/or metallic contacts made from iron, zinc, aluminum, copper, carbon, silver or any other type of conductive material. Welding will melt the TF battery and antenna substrate together and also form the galvanic contact between the battery and antenna. Welding pattern, time and temperature have impact on mechanical reliability. Non-conductive adhesive between layers can improve mechanical strength of bonding.

Figure 9:
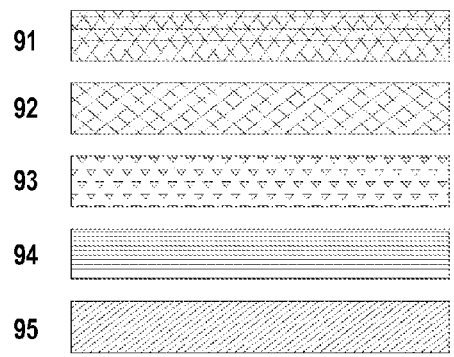
FIG. 9 shows some exemplary different patterns for welding tool according to an embodiment of the present invention.

FIG. 9 shows some exemplary different patterns for welding tool according to an embodiment of the present invention. Pattern has to be selected such a way that tool penetrates through metallization and adhesive layer. Optimal pattern depends on welding method and materials.

In FIG. 9, 91 is triangular shape of welding tool. 92 is square shape of welding tool. 93 is small triangular shape of welding tool. Other shapes can be used like pyramid shape. 94 is horizontal line pattern of welding tool. Pattern can be also vertical. 95 is diagonal line pattern of welding tool.

It is also noted that the above-identified welding process in the reel to reel format can be done in continuous mode or stop-and-go mode. Detailed description related to these two modes will be presented below.

Figure 10:
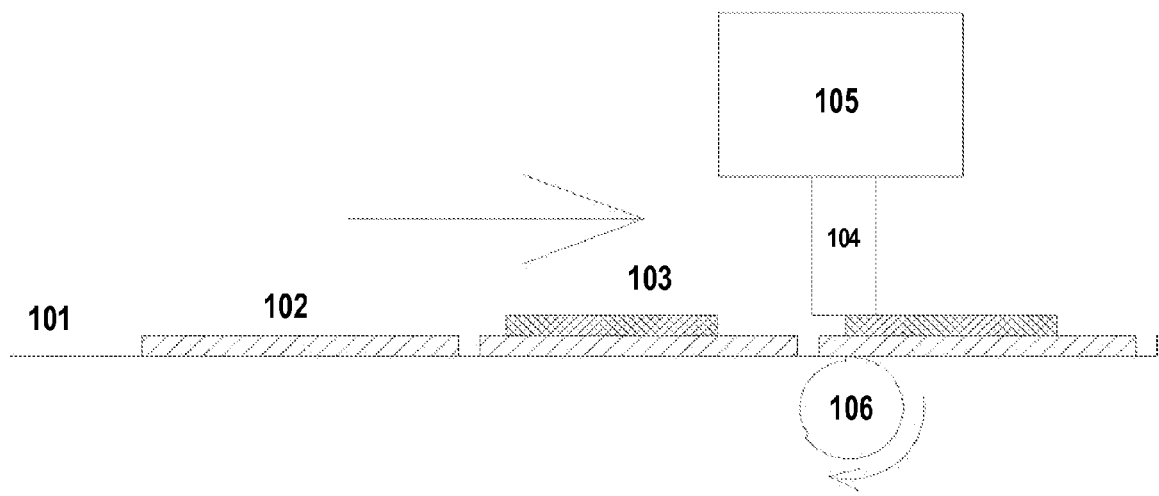
FIG. 10 shows an example of a continuous mode of welding according to an embodiment of the present invention.

FIG. 10 shows an example of a continuous mode of welding according to an embodiment of the present invention. Thin film batteries 103 are bonded to antenna with PSA or hot-melt. The tag is put through ultrasonic welding tool. Ultrasonic generator 105 generates high frequency vibration (20 kHz-70 kHz), which is guided to the sonotrode 104. Continuous mode of welding can be obtained with the rotating cylinder 106. Rotation can be synchronized with the antenna patterns, when the ultrasonic welding is used only for certain areas like contacts of the TF battery. Welding occur only in areas where there is pressure between the sonotrode 104 and cylinder 106.

In FIG. 10, 101 is an antenna substrate, which is typically a thin PET film. 102 is an antenna pattern, which is typically etched copper or aluminum. 103 is a TF battery. 104 is a sonotrode. 105 is a ultrasonic generator. 106 is a rotating cylinder with pattern shown in FIG. 9. Welding pattern is milled on the cylinder.

Figure 11:
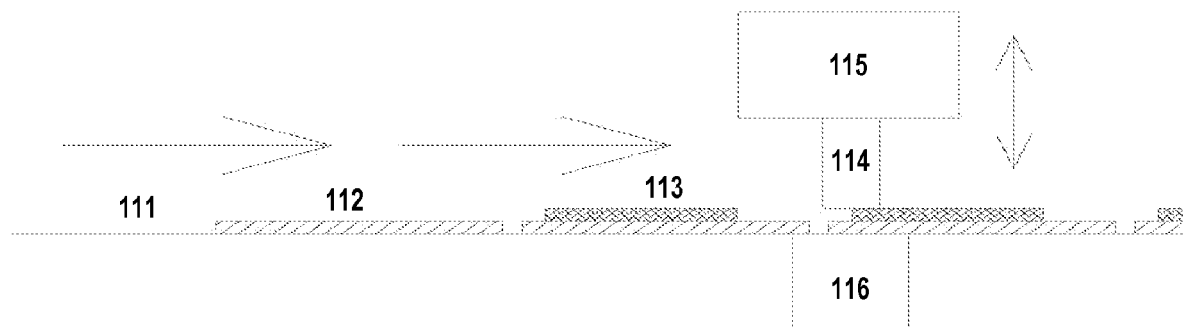
FIG. 11 shows an example of a stop-and-go mode of welding according to an embodiment of the present invention.

FIG. 11 shows an example of a stop-and-go mode of welding according to an embodiment of the present invention. Principle is same than in FIG. 10, except the antenna web 11 will stop during the welding. The sonotrode 114 is moving up and down. Welding pattern is milled to the counterpart 116. Welding occurs only high levels of the pattern, where the pattern press the two counterparts more than in the lower level of the welding pattern.

In FIG. 11, 111 is an antenna substrate, which is typically a thin PET film. 112 is an antenna pattern, which is typically etched copper or aluminum. 113 is a TF battery. 114 is an sonotrode. 115 is a ultrasonic generator. The generator is moving up and down in synchronization with the antenna web. 116 is milled counterpart as seen in FIG. 9.

Ultra-sonic or heat welding can be utilized to reduce drying problem of the battery, which will reduce life time of the BAP tag. De-hydration of thin film battery is one of the major problems in applications with high ambient temperatures, typically over +50° C. Zinc-manganese based TF batteries have water as a chemical component in order to enable the functionality. Thin film battery or the whole RFID tag can be hermetically sealed with heat or ultra-sonic welding. This additional welding will also protect the battery and other electronics from external moisture. The TF battery welding can be bonded in the same process step as where the tag is hermetically sealed.

Figure 12:
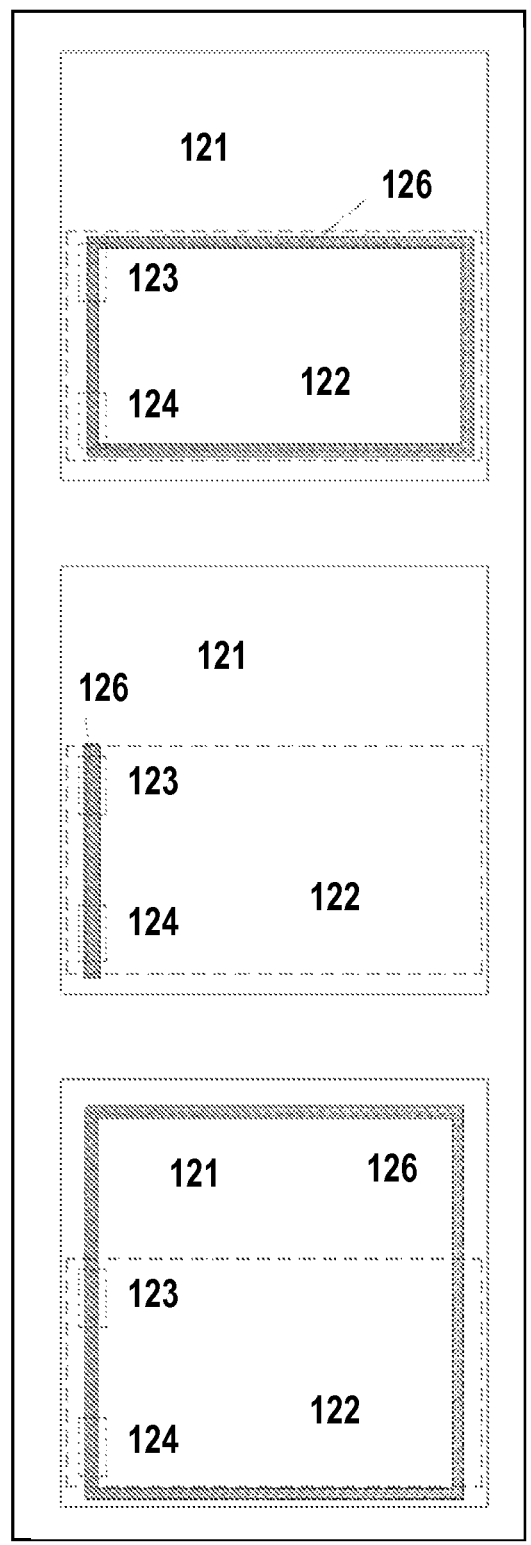
FIG. 12 shows some exemplary counterparts for the welding according to an embodiment of the present invention.

FIG. 12 shows some exemplary counterparts for the welding according to an embodiment of the present invention. Few alternatives for welding pattern 126 are presented in FIG. 12. TF battery 122 is laminated on the antenna 121. Also face and back layers can be laminated before welding. TF battery contacts 123 and 124 are also shown in the figure. The top welding pattern improves the sealing of the battery and also forms galvanic contacts between antenna and TF battery. The middle welding pattern forms only contacts between battery and antenna. The bottom welding pattern seals the antenna and battery and forms the galvanic contacts between antenna and TF battery.

Ultrasonic or heat welding can be also used to attach so called RFID straps to the antenna. A RFID strap is basically an RFID microstrip assembled on top of a small carrier film i.e. substrate with conductive strips connected to the RFID microstrip. A RFID strap can be regarded as a carrier film for the microchip, which does not have the antenna element designed for far-field radiation. These straps can then be bonded to various RFID tag antenna structures in comparison to direct microchip bonding, where the microchip is directly attached to an RFID tag antenna.

Figure 13:
FIG. 13 shows the simplified cross-section of the BAP tag according to an embodiment of the present invention.
Figure 13:
Figure 13:
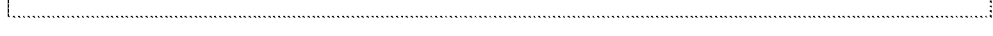
Figure 13:
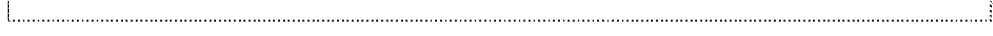

FIG. 13 shows the simplified cross-section of the BAP tag according to an embodiment of the present invention. TF battery 133 is laminated on the RFID antenna 132. Face layer 134 is laminated on top of the TF battery and the antenna. Back layer 131 is laminated under the antenna.

TF batteries are usually very vulnerable for the temperature and aging. Time and high temperature will dry the battery inside, which will gradually eliminate the chemical reaction. Also freezing will stop the chemical reaction required for voltage supplying from the TF battery. Solar cells or photo voltaic cells are better for applications where there is light emitted source available. Solar cell is very suitable for the vehicle identification application and other applications where identification occurs under daylight.

Therefore, a thin film battery can also be replaced with a thin film photovoltaic or solar cell (id est) as long as it supplies sufficient voltage to the RFID microchip. The advantages with solar cells are also the usability in reel to reel format which reduces cost compared to rigid solar cells which typically are bonded to rigid printed circuit boards. Bonding of a thin film solar cell is similar than the thin film battery. That is, a thin film solar cell can be mounted with a conductive adhesive or with ultrasonic or heat welding. Also the welding process in the reel to reel format can be done in continuous mode or stop-and-go mode as described above.

Typical current consumption for BAP RFID silicon is 5 uA and minimum voltage is 1.2V. As an example, type SP3-37 thin film solar cell from Powerfilm Inc. can produce 22 mA and 3V. Module size is 50 mm×37 mm×0.2 mm, which is smaller than typical RFID label. Even very small solar cell can produce 5000 times more current than needed, which means that the tag will operate in very poorly lighted conditions without energy storage in battery or capacitor form.

A capacitor or a battery can be connected parallel with the solar cell to storage power for RFID microchip. Capacitor and battery will be as a power reservoir when the solar cell is not receiving light for its photo voltaic process.

Figure 14:
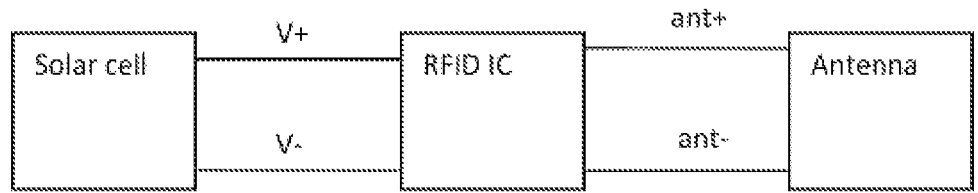
FIG. 14 shows the schematics of solar cell assisted passive tag (SAP) according to an embodiment of the present invention.
Figure 14:
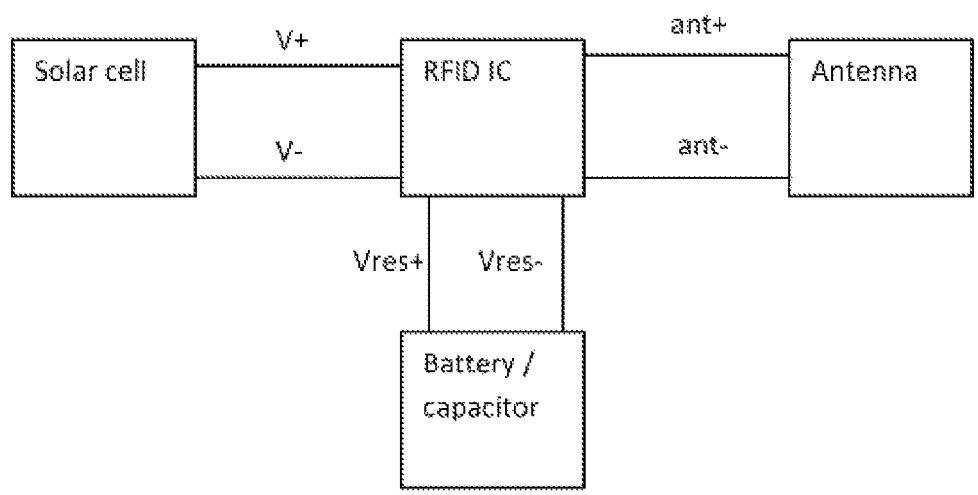
Figure 14:
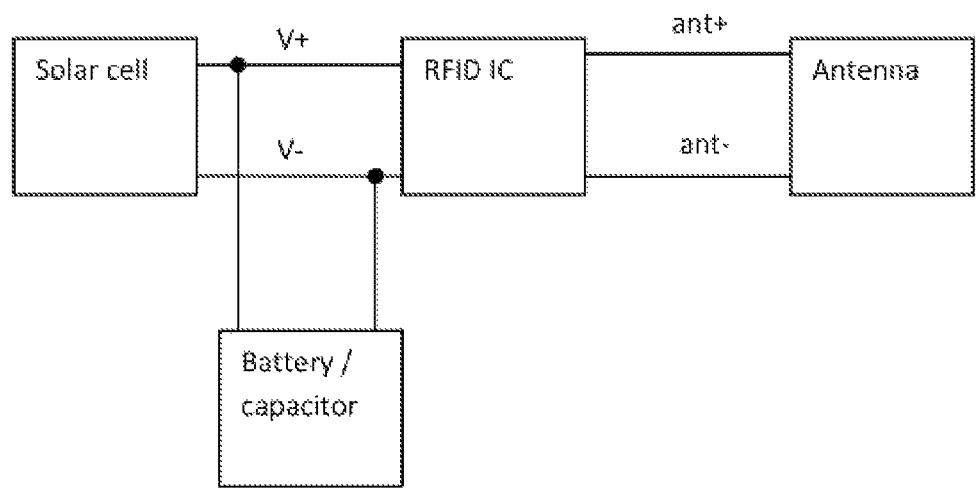

FIG. 14 shows the schematics of solar cell assisted passive tag (SAP) according to an embodiment of the present invention. Top schematic is without power reservoir. The solar cell is connected to Vcc of RFID silicon. The antenna is also connected to the IC. Middle and bottom schematics are with a power reservoir, which can be a battery or a capacitor. The IC can have separate pads for the power reservoir (shown in middle schematics) or the power reservoir can be in parallel with the solar cell (shown in bottom schematics). Separate pads would enable recharging from the reader field. Charge pump of IC can be exploited.

Super capacitor or battery can be connected to RFID IC or parallel with the photo voltaic cell. Battery or capacitor will be power reservoir if the solar cell is not able to produce enough energy. Low profile super capacitor can be of 0.5 F, which would have enough energy for several hours or even days. Capacitor can be charged also from the reader field. RFID IC would rectify RF signal when it is in strong reader field. Stored energy will be used in BAP tag when the tag is in low reader field. The attachment method for capacitor or battery can use conductive adhesive materials or be welded, wherein said welding process can use conductive adhesive or non-conductive adhesive.

An alternative to photo voltaic cell is a beta decay source power cell e.g. a tritium power cell where the light source is replaced by a beta decay source (i.e. emits electrons). In the case of Tritium Battery the beta source is Tritium, an isotope of Hydrogen with a half-life of 12.3 years. The beta source emits beta particles (electrons) onto the surface of the cell thereby creating an electrical current. The main advantage of using Tritium as a beta source is the extremely long life of the source. It can provide over 20 years of power while being enclosed in a self contained unit that does not require sunlight and can operate under almost any temperature conditions. This is quite unlike traditional batteries that are chemical based and behaves poorly under extreme temperature variations and conditions.

Figure 16:
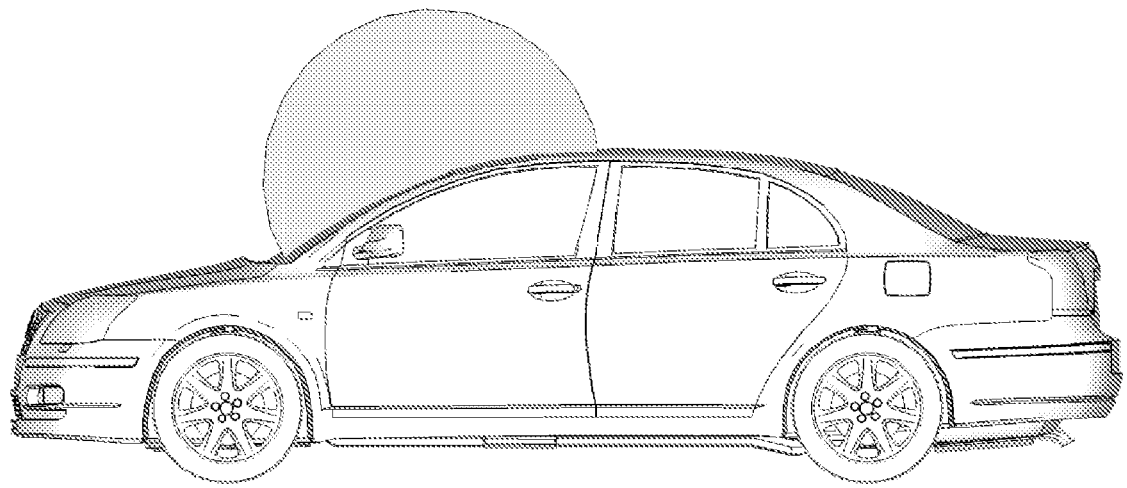
FIG. 16 shows a typical radiation pattern of the dipole antenna attached on windscreen.

FIG. 15 shows an example of the method of encrypting the identification key data of the RFID transponder. In the process of the transponder identification number generation (see the left side of FIG. 15), the meaningful data+checksum is inputted and the key is inputted too, then the transponder identification number is obtained. In the process of the transponder data retrieval (see the right side of FIG. 15), the transponder identification number is inputted and the key is inputted too, then the meaningful data+checksum is obtained FIG. 16 shows typical radiation pattern of the horizontal dipole antenna attached on windshield. The dipole antenna has donut shape radiation pattern, which will give good read distance on top and front of the vehicle. Radiation pattern can optimized to give better read distance from to front of the car, since read distance from the top can be reduces.

Figure 17:
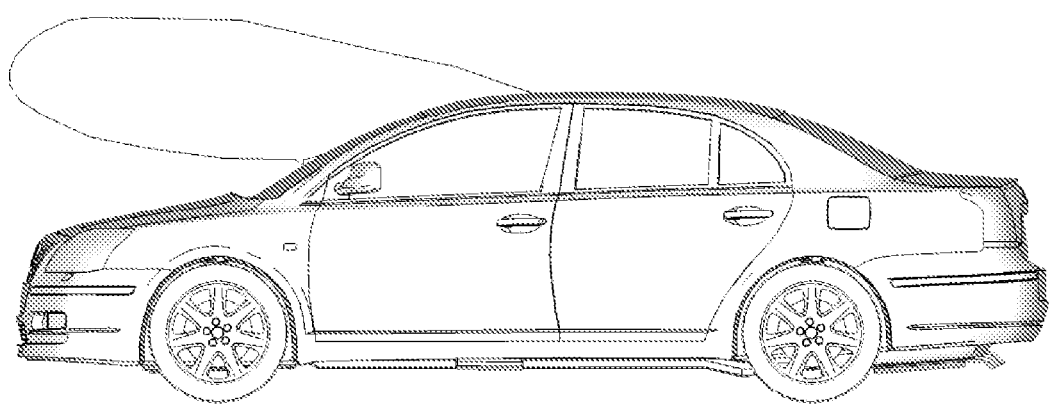
FIG. 17 shows the radiation pattern of directive antenna array.

FIG. 17 shows optimized radiation pattern of the windshield label. The pattern can be produced with antenna array or adding director element outside the windshield. Optimized radiation pattern might reduce read range from to top but will enhance from the front, which is beneficial in some applications. Antenna array can be done with several antenna elements, which are driven with signal in different phase. Direction of the main lobe can be optimized by adjusting phase of the signals and distance between elements. Parasitic elements can be also used like in Uda-Yagi antenna. Two element antenna can improve tag sensitivity by 3 dB. Additional elements will enhance performance even more.

Figure 18:
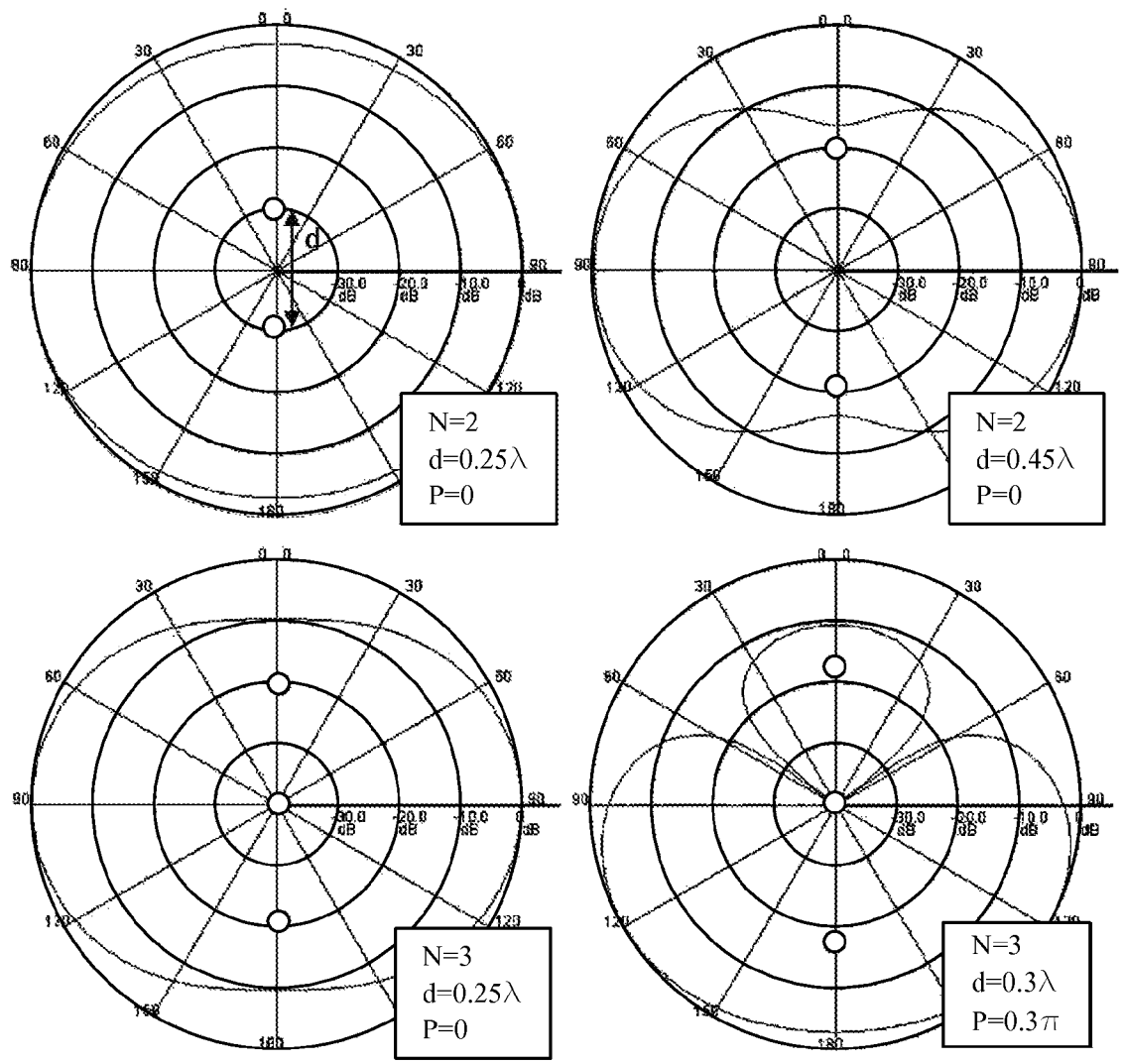
FIG. 18 shows typical array factors of antenna arrays with various element number, element distance and feeding phase difference.

FIG. 18 shows different array factors for different antenna array configurations. Suitable configuration will be selected based on the application. Pattern will depend on number of antenna element, distance between elements and phase of driven RF signal.

Figure 19:
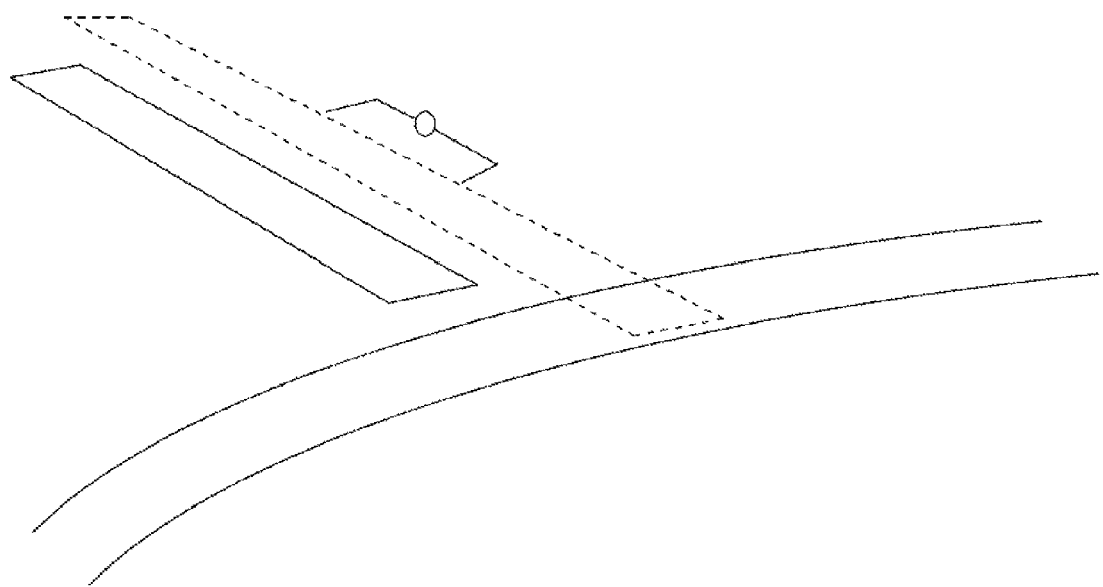
FIG. 19 shows the antenna structure with additional director element outside the windshield.

FIG. 19 shows the windshield antenna with parasitic director element. The director element will change the radiation pattern and improve the gain to the desired direction. The director element can be also integrated to the windshield during the windscreen manufacturing process. Parasitic element can be also manufactured with same process as typical RFID antennas.

Figure 20:
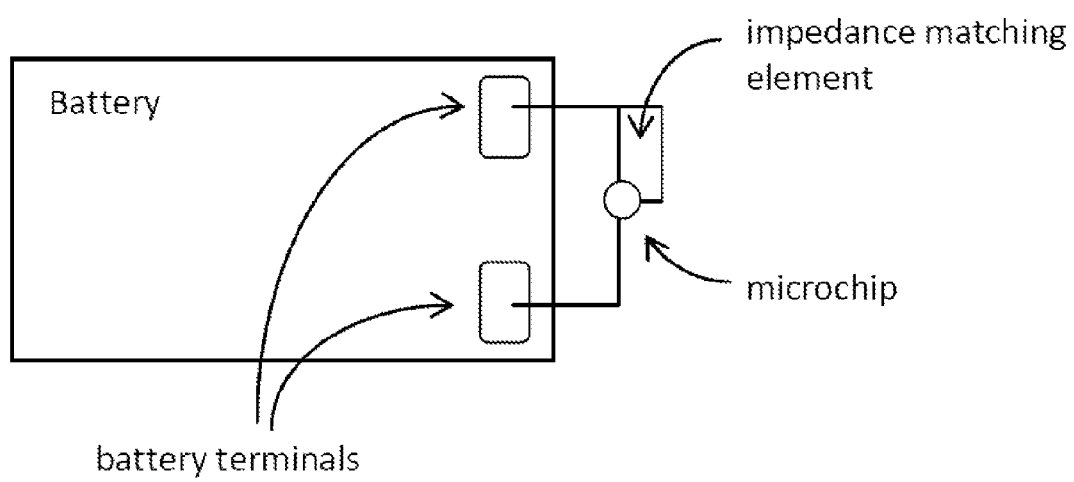
FIG. 20 shows alternative antenna structure for the tag.

FIG. 20 shows the alternative semi-passive or active tag structure. The tag structure exploited the battery such a way that the battery itself is acting as an antenna. This will dramatically reduce the tag manufacturing costs and will make tag dimensions more compacts. Battery is harvesting the energy from the reader and will conduct the RF signal to the microchip. Additional impedance matching element will improve matching between the microchip and the battery. Dimensions and shape of the battery have significant effect to the sensitivity of the tag. The impedance matching element shape and size can vary from the FIG. 20 depending on the battery size and microchip impedance.

Figure 21:
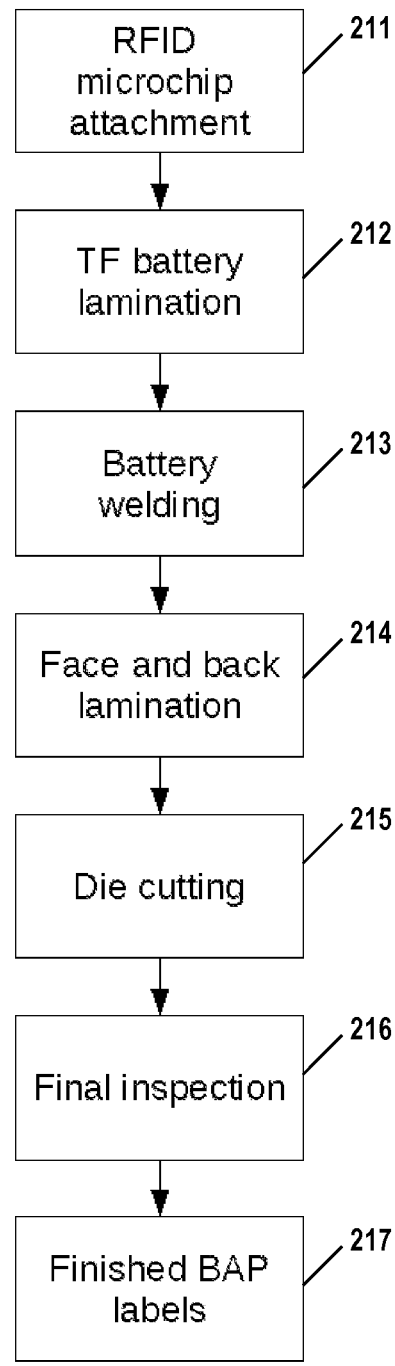
FIG. 21 is a block diagram of BAP label manufacturing.

FIG. 21 presents the block diagram for BAP label manufacturing. Manufacturing process starts with RFID microchip attachment to the antenna 211. The chip can be attached on antenna with direct flip-chip process or some other IC attachment method. Inlays are processed in reel to reel format. Secondly the TF battery is laminated on top of RFID inlay 212. Battery can be attached with PSA or hotmelt. Pressure is generated with pressure rolls. In third step, electrical connection is formed with ultrasonic or heat welding 213. Pressure is also used. Fourth step is face and back film lamination 214. Films provide protection for corrosion and UV. They also protects from moisture. Films are attached with PSA or hotmelt to the RFID inlay. Fifth step is die cutting to the final size and shape of the label 215. Sixth step is the label inspection 216. Battery connection can be inspected and RF performance measured. If predefined limits are exceeded, the product will be rejected and marked as bad mark. Finally, final products are rewinded to the reel 217. Delivery format can be also singulated or fan-fold format.

While the present invention has been described with reference to what are presently considered to be the preferred embodiments, it is to be understood that the invention is not limited to the disclosed embodiments. On the contrary, the invention is intended to cover all modifications and equivalent arrangements included within the spirit and scope of the appended claims. The scope of the following claims is to be accorded the broadcast interpretation so as to encompass all such modifications and equivalent structures and functions.

What is claimed is:

1. A radio frequency identification (RFID) transponder, comprising:
    a microchip having a capacitance coupled to an inductive loop for forming an appropriate inductance for a resonant circuit, the microchip which is arranged to communicate with a reader;
    a battery which is arranged to provide an electrical power for operating the transponder, and is attached to the microchip by means of a conductive path;
    an antenna which is arranged to receive and backscatter radio frequency interrogation radiation, wherein the battery acts as a ground plane for and is directly electrically coupled to the antenna; and a substrate, on which the microchip, the battery and the antenna are arranged.

2. The transponder of claim 1, wherein the battery is integrated as a part of the antenna.

3. The transponder of claim 2, wherein the battery acts as a pole of the antenna when the antenna is a dipole antenna.

4. The transponder of claim 1, wherein the antenna is an inverted F antenna or a dipole antenna.

5. The transponder of claim 1, wherein the conductive path is a conductive wire, conductive glue or mechanical bond.

6. The transponder of claim 1, further comprising an encryption component, which is arranged to encode vehicle specific data with an encryption algorithm for preventing unauthorized use, cloning or counterfeiting of the RFID transponder.

7. The transponder of claim 1, wherein the microchip comprises: both the analog part to modify the impedance matching of the antenna and the digital part which holds the logical functions and memory to enable the RFID functionalities according to the used air-interface standards.

8. The transponder of claim 1, wherein the substrate further comprising IC bonding area and contact area for battery.

9. The transponder of claim 1, wherein battery connection to the antenna or the microchip is done with mechanically crimping the layers to each other, by using conductive paste or film (ACP, ACF) or soldering.

10. The transponder of claim 1, wherein the transponder is primarily authenticated by utilizing the tag identification (TID) number which is unique for all microchips.

11. The transponder of claim 1, wherein the battery is attached to the antenna or the microchip by welding process.

12. The transponder of claim 11, wherein said welding process is an ultra-sonic welding process.

13. The transponder of claim 11, wherein said welding process is a heat welding process.

14. The transponder of claim 11, wherein said welding process uses non-conductive adhesive.

15. The transponder of claim 14, wherein said welding process uses pressure sensitive adhesive.

16. The transponder of claim 14, wherein said welding process uses hot melt adhesive.

17. The transponder of claim 11, wherein said battery is sealed by welding process.

18. The transponder of claim 11, wherein said transponder is sealed by welding process.

19. The transponder of claim 11, wherein RFID straps are attached to said antenna by welding process.

20. The transponder of claim 11, wherein galvanic connection is formed between the battery and RFID tag circuitry in continuous reel-to-reel process by pressing the battery and RFID tag circuitry together and creating a defined pattern.

21. The transponder of claim 11, wherein galvanic connection is formed between the battery and RFID tag circuitry in stop-and-go, reel-to-reel process by pressing the battery and RFID tag circuitry together and creating a defined pattern.

22. The transponder of claim 1, wherein the battery is a thin film battery.

23. The transponder of claim 1, wherein the battery is replaced by a thin photo voltaic cell.

24. The transponder of claim 23, wherein said transponder comprises a power reservoir.

25. The transponder of claim 24, wherein said power reservoir is attached to an antenna and microchip by using welding process.

26. The transponder of claim 25, wherein said welding process uses conductive adhesive.

27. The transponder of claim 25, wherein said welding process uses non-conductive adhesive.

28. The transponder of claim 24, wherein said power reservoir is attached to an antenna and microchip by using conductive adhesive materials.

29. The transponder of claim 24, wherein said power reservoir is in parallel with said photo voltaic cell.

30. The transponder of claim 24, wherein said power reservoir is in connected with said microchip directly.

31. The transponder of claim 24, wherein said power reservoir is a capacitor.

32. The transponder of claim 24, wherein said power reservoir is a battery.

33. The transponder of claim 1, wherein the battery is a beta decay source power cell.

34. The transponder of claim 33, wherein the beta decay source power cell is a tritium power cell.

35. The transponder of claim 1, wherein transponder identification number contains meaningful data and data is encrypted with cryptographic measures to prevent counterfeiting.

36. A method for fabricating a radio frequency identification (RFID) transponder, comprising:

preparing a substrate, wherein a perforation area is arranged to weaken the tensile strength of the substrate, so that when an adhesive label is attempted to be removed the substrate will tear along the perforation; and arranging a microchip having a capacitance, a battery and an antenna on the substrate, wherein the microchip is coupled to an inductive loop for forming an appropriate inductance for a resonant circuit, the microchip is arranged to communicate with a reader, the battery is arranged to provide electrical power for operating the transponder, and is attached to the microchip by means of a conductive path, and the antenna is arranged to receive and backscatter radio frequency interrogation radiation, and wherein the battery acts as a ground plane for and is directly electrically coupled to the antenna.

37. The method of claim 36, wherein battery connection to the antenna or microchip is done with mechanically crimping the layers to each other, by using conductive paste or film (ACP, ACF) or soldering.

38. The method of claim 36, wherein the battery is attached to the antenna and the microchip by welding process.

39. The method of claim 38, wherein said welding process is an ultra-sonic welding process.

40. The method of claim 38, wherein said welding process is a heat welding process.

41. The method of claim 38, wherein said welding process uses non-conductive adhesive.

42. The method of claim 41, wherein said welding process uses pressure sensitive adhesive.

43. The method of claim 41, wherein said welding process uses hot melt adhesive.

44. The method of claim 38, wherein said battery is sealed by welding process.

45. The method of claim 38, wherein said transponder is sealed by welding process.

46. The method of claim 38, wherein RFID straps are attached to said antenna by welding process.

47. The method of claim 38, wherein galvanic connection is formed between the battery and RFID tag circuitry comprising at least antenna and microchip in continuous reel-toreel process by pressing the battery and the RFID tag circuitry together and creating a defined pattern.

48. The method of claim 38, wherein galvanic connection is formed between the battery and RFID tag circuitry in stop-and-go, reel-to-reel process by pressing the battery and RFID tag circuitry together and creating a defined pattern.

49. A radio frequency identification (RFID) transponder, comprising:
- a microchip having a capacitance coupled to an inductive loop for forming an appropriate inductance for a resonant circuit, the microchip which is arranged to communicate with a reader;
- a battery which is arranged to provide an electrical power for operating the transponder, and is attached to the microchip by means of a conductive path, wherein the battery is a thin photo voltaic cell;
- an antenna which is arranged to receive and backscatter radio frequency interrogation radiation, wherein the battery acts as a ground plane for and is directly electrically coupled to the antenna; and
- a substrate, on which the microchip, the battery and the antenna are arranged.

\* \* \* \* \*